United States Patent
O'Rourke

(10) Patent No.: US 7,542,730 B2
(45) Date of Patent: Jun. 2, 2009

(54) METHOD AND SYSTEM FOR FILTERING WAVETABLE INFORMATION FOR WIRELESS DEVICES

(75) Inventor: Connor O'Rourke, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 557 days.

(21) Appl. No.: 10/995,428

(22) Filed: Nov. 24, 2004

(65) Prior Publication Data

US 2006/0111088 A1 May 25, 2006

(51) Int. Cl.
*H04B 1/46* (2006.01)
(52) U.S. Cl. .................. 455/81; 455/414.1; 455/414.2; 455/414.3; 455/414.4
(58) Field of Classification Search ............... 455/414.1, 455/81, 414.2, 414.3, 414.4, 563, 556.2, 455/3.05, 3.06, 456.6
See application file for complete search history.

(56) References Cited

U.S. PATENT DOCUMENTS 6,195,736 B1 * 2/2001 Lisle .......................... 711/206
6,525,256 B2 * 2/2003 Boudet et al. ................. 84/645
6,526,256 B2   2/2003 Boudet et al.
2002/0002413 A1 * 1/2002 Tokue ......................... 700/94
2003/0224767 A1 * 12/2003 Futamase et al. .......... 455/414.1
2003/0224787 A1   12/2003 Futamase et al.
2004/0043758 A1 * 3/2004 Sorvari et al. ............. 455/414.1
2004/0044781 A1 * 3/2004 Hymel et al. ................ 709/229
2005/0227674 A1 * 10/2005 Kopra et al. .............. 455/414.1

FOREIGN PATENT DOCUMENTS

EP       1 251 488     10/2002

* cited by examiner

*Primary Examiner*—Tuan A Pham
(74) *Attorney, Agent, or Firm*—Ogilvy Renault LLP

(57) ABSTRACT

A method for providing wavetable information to a wireless device from a content server over a wireless network, the wavetable information including a plurality of samples corresponding to a plurality of notes, comprising: in response to a request from the wireless device, receiving at a proxy server the wavetable information from the content server; filtering the wavetable information in accordance with a selection of samples contained in the request; and, transmitting the filtered wavetable information to the wireless device.

14 Claims, 12 Drawing Sheets

METHOD AND SYSTEM FOR FILTERING WAVETABLE INFORMATION FOR WIRELESS DEVICES

FIELD OF THE INVENTION

This invention relates to the field of wavetable information, and more specifically, to filtering wavetable information prior to downloading to a wireless device.

BACKGROUND

Current wireless mobile communication devices include microprocessors, memory, soundcards, and run one or more software applications. Examples of software applications used in these wireless devices include micro-browsers, address books, email clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms.

A wavetable instrument is an application that digitally models a real instrument (e.g., a piano, etc.) using information from a wavetable file. A waveable instrument may allow a user to "play" songs by depressing one or more keyboard keys, etc., thus providing interactive audio.

The content of the wavetable file includes captured audio samples of the instrument combined with various configuration settings in order to provide an approximation of the sound of the instrument at any note or pitch. Downloadable wavetable content is wavetable content stored in a file having a specific file format that can be downloaded to a user system, such as a wireless device or personal computer, for storage in system memory or in the memory of the system's soundcard or audio synthesizer. In addition to wavetable instruments, downloadable wavetable content can be used for applications such as music for games, web pages, and polyphonic ringtones. Downloadable wavetable content can provide consistent sounding audio across all platforms while requiring only a fraction of the storage resources required by other audio files such as MP3s. Examples of downloadable wavetable data file formats include the Downloadable Sounds ("DLS") file format from the Musical Instruments Digital Interface ("MIDI") Manufacturers Association and the SoundFont® file format from Creative Labs, Inc.

Thus, wavetable content may be downloaded from a network such as the Internet by a wireless device for playback through a wavetable instrument application via the device's soundcard or audio synthesizer.

However, one shortcoming of present wireless devices and wireless communications systems is their inability to efficiently download such wavetable content to wireless devices. For example, optimizing the size and level of detail when creating wavetable instruments that are to be downloaded via network communications onto a push-enabled wireless device cannot be done in advance because capabilities of different wireless devices vary and the amount of resources (e.g., flash memory, remaining carrier-enforced data limits, etc.) available is limited and constantly changing due to the arrival of new messages, calendar appointments, etc. The need to efficiently download wavetable content is increasing in importance with the increase in the number of applications being run on wireless devices.

A need therefore exists for an improved method and system of downloading wavetable information to wireless devices. Accordingly, a solution that addresses, at least in part, the above and other shortcomings is desired.

SUMMARY

According to one aspect of the invention, there is provided a method for providing wavetable information to a wireless device from a content server over a wireless network, the wavetable information including a plurality of samples corresponding to a plurality of notes, comprising: in response to a request from the wireless device, receiving at a proxy server the wavetable information from the content server; filtering the wavetable information in accordance with a selection of samples contained in the request; and, transmitting the filtered wavetable information to the wireless device.

Preferably, the method further includes the proxy server receiving a request for metadata for the wavetable information from the wireless device, the metadata including sample sizes for the samples.

Preferably, the method further includes, in response to the request for metadata, the proxy server transmitting the metadata to the wireless device.

Preferably, the method further includes the proxy server receiving the metadata from the content server.

Preferably, the method further includes the proxy server extracting the metadata from the wavetable information.

Preferably, the wireless device is adapted for calculating a desired number of samples for the selection of samples from a maximum of the sample sizes and an amount of available memory in the wireless device.

Preferably, the wireless device is further adapted for determining the selection of samples by forming groups of notes in accordance with spacings between the notes, allocating one of the desired number of samples to each group, and selecting a sample for the notes in each group that corresponds to a note at a midpoint of the group to reduce distortion.

According to another aspect of the invention, there is provided a method for providing wavetable information to a wireless device from a content server over a wireless network, the wavetable information including a plurality of samples corresponding to a plurality of notes, comprising: in response to a request from the wireless device, receiving at a proxy server the wavetable information from the content server; filtering the wavetable information in accordance with an amount of available memory in the wireless device as contained in the request; and, transmitting the filtered wavetable information to the wireless device.

Preferably, the filtering further comprises calculating a desired number of samples from a maximum of the sample sizes and the amount of available memory in the wireless device.

Preferably, the filtering further comprises determining a selection of samples by forming groups of notes in accordance with spacings between the notes, allocating one of the desired number of samples to each group, and selecting a sample for the notes in each group that corresponds to a note at a midpoint of the group to reduce distortion.

According to another aspect of the invention, there is provided a method for filtering wavetable information in a wireless device, the wavetable information including a plurality of samples corresponding to a plurality of notes, comprising: calculating a desired number of samples from a maximum of the sample sizes and an amount of available memory in the wireless device; and, determining a selection of samples by forming groups of notes in accordance with spacings between the notes, allocating one of the desired number of samples to each group, and selecting a sample for the notes in each group that corresponds to a note at a midpoint of the group to reduce distortion.

In accordance with further aspects of the present invention there is provided an apparatus such as a proxy server system, a method for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
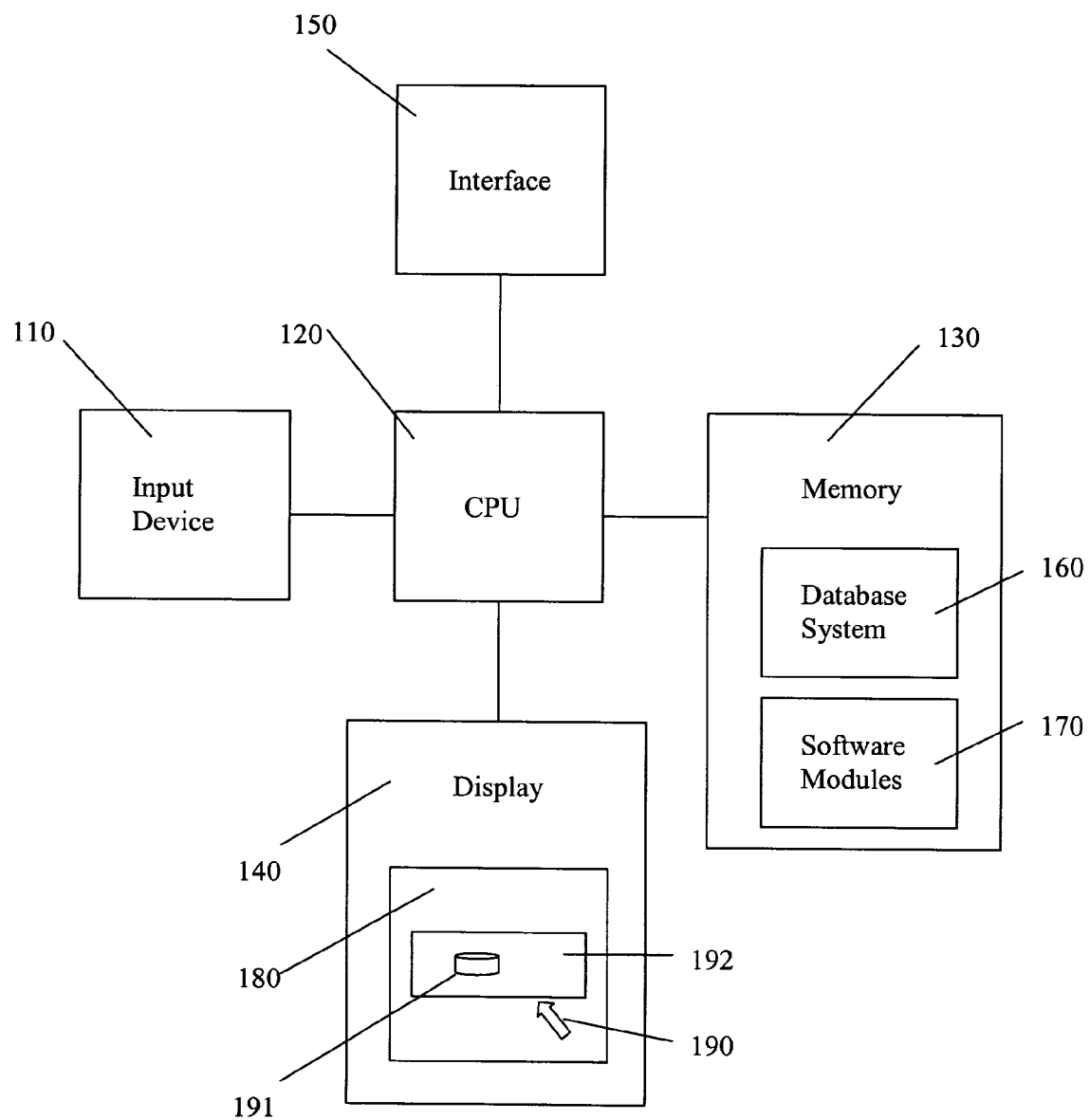
FIG. 1 is a block diagram illustrating a proxy server system adapted for implementing an embodiment of the invention.

The following detailed description of the embodiments of the present invention does not limit the implementation of the invention to any particular computer programming language. The present invention may be implemented in any computer programming language provided that the operating system ("OS") provides the facilities that may support the requirements of the present invention. A preferred embodiment is implemented in the JAVA™ computer programming language (or other computer programming languages such as C or C++). (JAVA and all JAVA-based trademarks are the trademarks of Sun Microsystems Corporation.) Any limitations presented would be a result of a particular type of operating system or computer programming language and would not be a limitation of the present invention.

The present invention is directed to resource availability problems such as may be encountered when downloading wavetable information onto a wireless device for use with audio playback applications. Wavetable data files are generally considered to be compact when compared to alternative audio formats. However, as these files are typically created and used on desktop computers they are often too large or detailed for most mobile wireless devices. For example, the files may contain compact disc ("CD") quality samples, while the wireless device hardware may not be capable of CD quality audio output. The size and detail of the samples in this case would be wasteful.

Embodiments of the invention provide a method for a mobile wireless device to request a remote proxy server to download and filter out samples from a wavetable data file available from a content server. Requesting a proxy server to perform the filtering is a more economical use of the wireless device's airtime. The wavetable data file transferred from the proxy to the device in accordance with the invention is typically smaller than if that same wavetable data file was downloaded directly from the content server.

The filtering is performed based on information regarding which samples should be kept in the wavetable instrument (the rest are filtered out). This information is calculated by the wireless device or client based on variables such as the desired maximum size of a resulting wavetable instrument and which MIDI instructions will be used by the wireless device to play the wavetable instrument. Knowing which MIDI data will be used to drive the instrument allows for efficient filtering for the instrument in order to retain as much audio quality as possible.

In addition, the download process can be automated. For example, if a user downloads a game, the game application can follow up by automatically downloading wavetable content to be used for the game's background music upon the first run of the application. Furthermore, the download process can be interactive. For example, a user may wish to download a wavetable instrument that will be used to generate the sound for a specific set of MIDI/SP-MIDI ringtones. If the wavetable data file to be downloaded is one specified by a user, very little interaction is required in the download process. The user specifies the remote location of the wavetable data file desired for download and a set of MIDI files which will be used to play the wavetable instrument.

Advantageously, the present invention provides an automated method of reducing the size of a wavetable data file at runtime without manual editing. Currently, if a user wishes to reduce the size of a wavetable file, the user would have to download the entire file and manually edit the resource file using editing software. Not only is downloading the entire file before local editing uneconomical, it is not a trivial task as it requires knowledge of the specific file format and how wavetables operate.

FIG. 1 is a block diagram illustrating a proxy server system 100 adapted for implementing an embodiment of the invention. The proxy server system 100 includes an input device 110, a central processing unit or CPU 120, memory 130, a display 140, and an interface 150. The input device 110 may include a keyboard, mouse, trackball, remote control, or similar device. The CPU 120 may include dedicated coprocessors and memory devices. The memory 130 may include RAM, ROM, or disk devices. The display 140 may include a computer screen, terminal device, or a hardcopy producing output device such as a printer or plotter. And, the interface 150 may include a network connection including an Internet connection. The proxy server 100 is adapted for filtering and downloading wavetable information to wireless devices 210 over a wireless network 220 (see FIG. 2).

The proxy server system 100 may be a server system or a personal computer ("PC") system. The CPU 120 of the system 100 is operatively coupled to memory 130 which stores an operating system (not shown), such as IBM Corporation's OS/2™, UNIX, etc., for general management of the system 100. The interface 150 may be used for communicating to external data processing systems 230, 250 through a network 240 (see FIG. 2), such as the Internet. Examples of suitable platforms for the proxy server system 100 include iSeries™ servers and ThinkCentre™ personal computers available from IBM Corporation. The system 100 may include application server software (not shown), such as WebLogic® Server available from BEA Systems, Inc., for developing and managing distributed applications.

The proxy server system 100 may include a database system 160 for storing and accessing programming information. The database system 160 may include a database management system ("DBMS") and a database and is stored in the memory 130 of the proxy server system 100.

The proxy server system 100 includes computer executable programmed instructions for directing the system 100 to implement the embodiments of the present invention. The programmed instructions may be embodied in one or more software modules 170 resident in the memory 130 of the proxy server system 100. Alternatively, the programmed instructions may be embodied on a computer readable medium (such as a CD disk or floppy disk) which may be used for transporting the programmed instructions to the memory 130 of the proxy server system 100. Alternatively, the programmed instructions may be embedded in a computer-readable, signal-bearing medium that is uploaded to a network by a vendor or supplier of the programmed instructions, and this signal-bearing medium may be downloaded through the interface 150 to the proxy server system 100 from the network by end users or potential buyers.

The CPU 120 of the system 100 is typically coupled to one or more devices 110 for receiving user commands or queries and for displaying the results of these commands or queries to the user on a display 140. As mentioned, the memory 130 may include a variety of storage devices including internal memory and external mass storage typically arranged in a hierarchy of storage as understood to those skilled in the art.

A user may interact with the proxy server system 100 and its software modules 170 using a graphical user interface ("GUI") 180. The GUI 180 may be web-based and may be used for monitoring, managing, and accessing the proxy server system 100. GUIs are supported by common operating systems and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Figure 2:
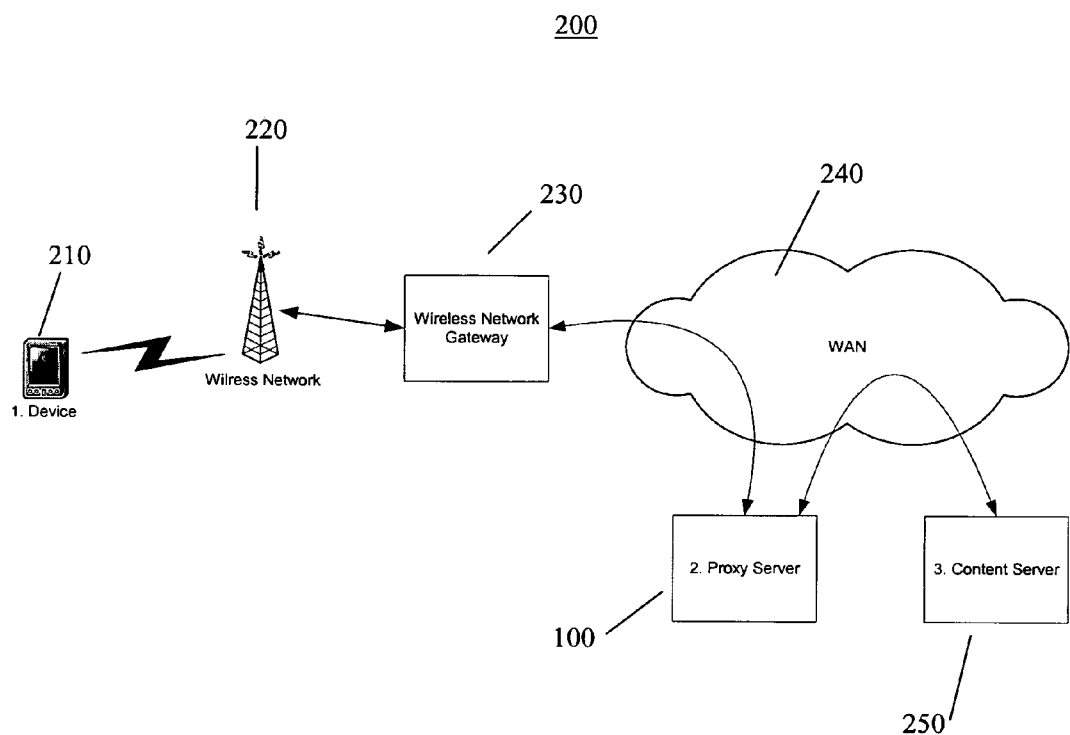
FIG. 2 is a block diagram illustrating a wireless communications system adapted for implementing an embodiment of the invention.

FIG. 2 is a block diagram illustrating a wireless communications system 200 adapted for implementing an embodiment of the invention. The wireless communications system 200 includes a wireless device 210 in communication with the proxy server system 100 over a wireless network 220. The wireless network 220 is coupled to a wireless network gateway 230 which provides an interface to a wide area network ("WAN") 240 to which the proxy server 100 is coupled. The proxy server 100 is also in communication with a content server system 250 over the WAN 240.

Figure 11:
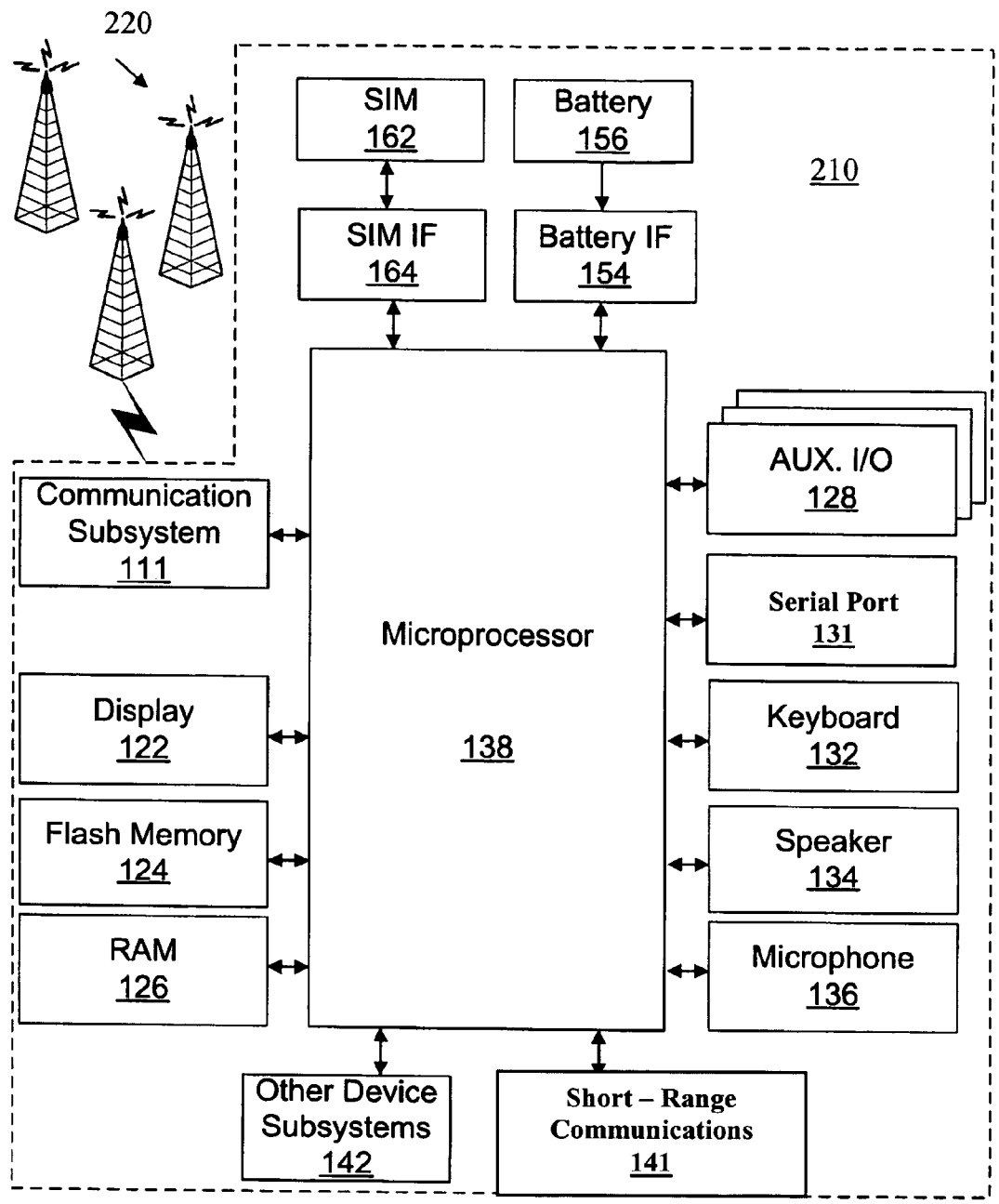
FIG. 11 is a block diagram illustrating an exemplary wireless device adapted in accordance with an embodiment of the invention; and, FIG. 12 is a block diagram illustrating a memory of the wireless device of FIG. 11 in accordance with an embodiment of the invention.

FIG. 11 is a block diagram illustrating an exemplary wireless device 210 adapted in accordance with an embodiment of the invention. The wireless device 210 is a two-way communication device having at least voice and advanced data communication capabilities, including the capability to communicate with other computer systems. Depending on the functionality provided by device 210, it may be referred to as a data messaging device, a two-way pager, a cellular telephone with data messaging capabilities, a wireless Internet appliance, or a data communication device (with or without telephony capabilities). Device 210 may communicate with any one of a plurality of fixed transceiver stations 220 within its geographic coverage area.

Device 210 will normally incorporate a communication subsystem 111, which includes a RF receiver, a RF transmitter, and associated components, such as one or more (preferably embedded or internal) antenna elements and, local oscillators ("LOs"), and a processing module such as a digital signal processor ("DSP") (all not shown). As will be apparent to those skilled in field of communications, particular design of communication subsystem 111 depends on the communication network 220 in which device 210 is intended to operate.

Network access is associated with a subscriber or user of device 210 and therefore device 210 requires a Subscriber Identity Module (or "SIM" card) 162 to be inserted in a SIM IF 164 in order to operate in the network. Device 210 is a battery-powered device so it also includes a battery IF 154 for receiving one or more rechargeable batteries 156. Such a battery 156 provides electrical power to most if not all electrical circuitry in device 210, and battery IF 154 provides for a mechanical and electrical connection for it. The battery IF 154 is coupled to a regulator (not shown) which provides power V+ to all of the circuitry.

Device 210 includes a microprocessor 138 which controls overall operation of device 210. Communication functions, including at least data and voice communications, are performed through communication subsystem 111. Microprocessor 138 also interacts with additional device subsystems such as a display 122, a flash memory 124 or other persistent store, a random access memory ("RAM") 126, auxiliary input/output ("I/O") subsystems 128, a serial port 131, a keyboard 132, a speaker 134, a microphone 136, a short-range communications subsystem 141, and any other device subsystems generally designated at 142. Some of the subsystems shown in FIG. 1 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list. Operating system software used by microprocessor 138 is preferably stored in a persistent store such as flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

Microprocessor 138, in addition to its operating system functions, preferably enables execution of software applications on device 210. A predetermined set of applications which control basic device operations, including at least data and voice communication applications, will normally be installed on device 210 during its manufacture. A preferred application that may be loaded onto device 210 may be a personal information manager ("PIM") application having the ability to organize and manage data items relating to the user such as, but not limited to, instant messaging ("IM"), e-mail, calendar events, voice mails, appointments, and task items. Naturally, one or more memory stores are available on device 210 and SIM 162 to facilitate storage of PIM data items and other information.

The PIM application preferably has the ability to send and receive data items via the wireless network 220. In a preferred embodiment, PIM data items are seamlessly integrated, synchronized, and updated via the wireless network, with the mobile station user's corresponding data items stored and/or associated with a host computer system thereby creating a mirrored host computer on device 210 with respect to such items. This is especially advantageous where the host computer system is the mobile station user's office computer system. Additional applications may also be loaded onto device 210 through network 220, an auxiliary I/O subsystem 128, serial port 131, short-range communications subsystem 141, or any other suitable subsystem 142, and installed by a user in RAM 126 or preferably a non-volatile store (not shown) for execution by microprocessor 138. Such flexibility in application installation increases the functionality of device 210 and may provide enhanced on-device functions, communication-related functions, or both. For example, secure communication applications may enable electronic commerce functions and other such financial transactions to be performed using device 210.

In a data communication mode, a received signal such as a text message, an e-mail message, or web page download will be processed by communication subsystem 111 and input to microprocessor 138. Microprocessor 138 will preferably further process the signal for output to display 122 and/or to auxiliary I/O device 128. A user of device 210 may also compose data items, such as e-mail messages, for example, using keyboard 132 in conjunction with display 122 and possibly auxiliary I/O device 128. Keyboard 132 is preferably a complete alphanumeric keyboard and/or telephone-type keypad. These composed items may be transmitted over a communication network through communication subsystem 111 or short range communication subsystem 141.

For voice communications, the overall operation of device 210 is substantially similar, except that the received signals would be output to speaker 134 and signals for transmission would be generated by microphone 136. Alternative voice or audio I/O subsystems, such as a voice message recording subsystem, may also be implemented on device 210. Although voice or audio signal output is preferably accomplished primarily through speaker 134, display 122 may also be used to provide an indication of the identity of a calling party, duration of a voice call, or other voice call related information, as some examples.

Serial port 131 in FIG. 11 is normally implemented in a personal digital assistant ("PDA")-type communication device for which synchronization with a user's desktop computer is a desirable, albeit optional, component. Serial port 131 enables a user to set preferences through an external device or software application and extends the capabilities of device 210 by providing for information or software downloads to device 210 other than through a wireless communication network. The alternate download path may, for example, be used to load an encryption key onto device 210 through a direct and thus reliable and trusted connection to thereby provide secure device communication.

Short-range communications subsystem 141 of FIG. 11 is an additional optional component which provides for communication between device 210 and different systems or devices, which need not necessarily be similar devices. For example, subsystem 141 may include an infrared device and associated circuits and components, or a Bluetooth™ communication module to provide for communication with similarly-enabled systems and devices. Bluetooth™ is a registered trademark of Bluetooth SIG, Inc.

Figure 12:
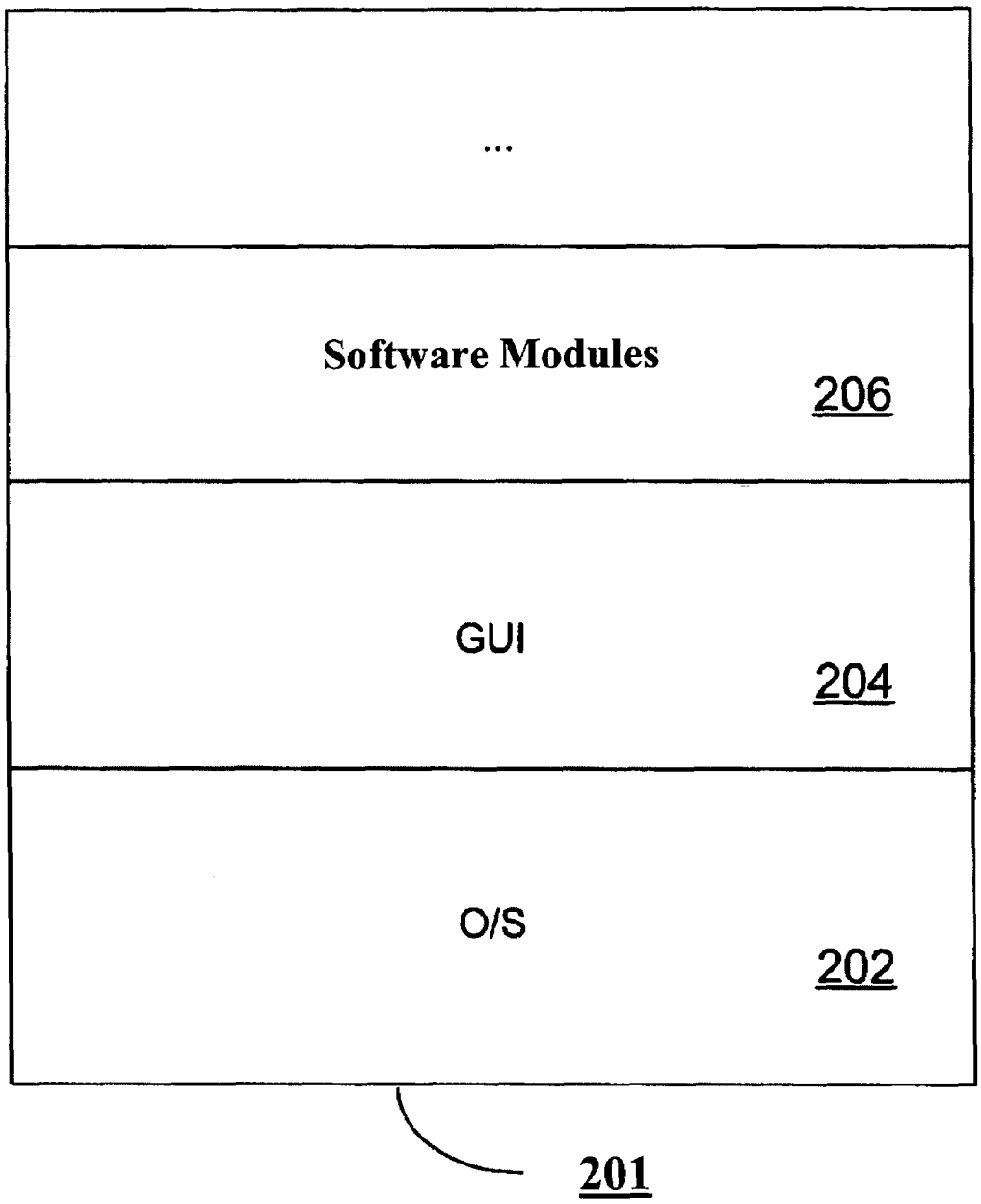

FIG. 12 is a block diagram illustrating a memory 201 of the wireless device 210 of FIG. 11 in accordance with an embodiment of the invention. The memory 201 has various software components for controlling device 210. Memory 201 may be flash memory 124, RAM 126 or a ROM (not shown), for example. In accordance with an embodiment of the invention, device 210 is intended to be a multi-tasking wireless communications device configured for sending and receiving data items and for making and receiving voice calls. To provide a user-friendly environment to control the operation of device 210, an operating system ("O/S") 202 resident on device 210 provides a basic set of operations for supporting various applications typically operable through a graphical user interface ("GUI") 204. For example, O/S 202 provides basic input/output system features to obtain input from Auxiliary I/O 108, keyboard 132 and the like and for facilitating output to the user. In accordance with an embodiment of the invention, there are provided software modules 206 for wavetable instrument applications as will be described below. Though not shown, one or more applications for managing communications or providing personal digital assistant like functions may also be included.

Thus, the wireless device 210 includes computer executable programmed instructions for directing the device 210 to implement the embodiments of the present invention. The programmed instructions may be embodied in one or more software modules 206 resident in the memory 201 of the wireless device 210. Alternatively, the programmed instructions may be embodied on a computer readable medium (such as a CD disk or floppy disk) which may be used for transporting the programmed instructions to the memory of the wireless device 210. Alternatively, the programmed instructions may be embedded in a computer-readable, signal-bearing medium that is uploaded to a network by a vendor or supplier of the programmed instructions, and this signal-bearing medium may be downloaded through an interface 111, 131, 141 to the wireless device 210 from the network by end users or potential buyers.

The wireless device 210 has software modules for running client software for downloading wavetable data files. This software may be a standalone application, browser plugin, etc. Once the client determines which samples should be kept in a wavetable instrument based on the desired size of the wavetable data file, and which MIDI data will be used to play it, this information is sent to the proxy server 100 as a request to have the wavetable data file filtered and returned to the wireless device 210.

The proxy server 100 runs wavetable data file filtering software. The proxy server 100 handles requests from wireless clients 210, downloads wavetable data files from the content server 250, and filters the downloaded wavetable data files locally. Typically, the proxy server 100 does not face the same memory and bandwidth constraints that the mobile devices 210 do.

The content server 250 is a remote machine that provides access to pre-created wavetable data files.

Figure 3:
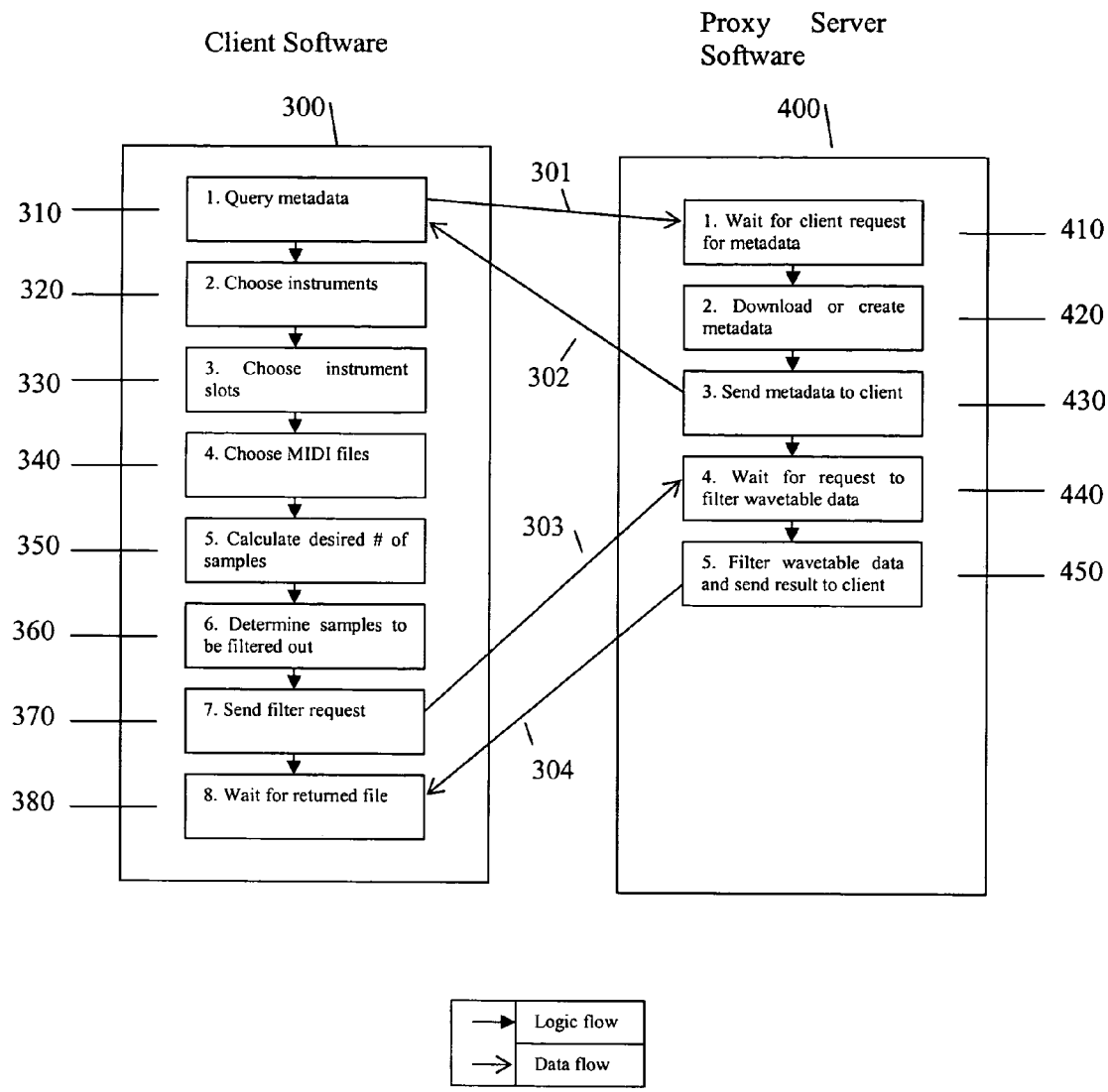
FIG. 3 is a flow chart illustrating operations of modules within the wireless communications system and wireless device for filtering wavetable content in accordance with an embodiment of the invention.

FIG. 3 includes flow charts illustrating operations 300, 400 of modules within a wireless device and proxy server system 210, 100, respectively, for downloading filtered wavetable content to the wireless devices 210 from the proxy server system 210 in accordance with an embodiment of the invention.

With respect to wireless device/client software modules, at step 310, the operations 300 start. A query message 301 is sent from the wireless device 210 to the proxy server 100 requesting a description of the required wavetable data file. In response, a description message 302 is received from the proxy server 100. This description, or metadata, typically contains information pertaining to the instrument(s) in the file and details with respect to the size, notes, etc., of the samples in the wavetable instrument(s).

At step 320, if there is more than one wavetable instrument in the data file, then a choice is made as to which instruments in the wavetable data file should be contained in the filtered data file.

At step 330, the "instrument slot(s)" are chosen for the wavetable instrument(s) that will be loaded into the wireless device's hardware or software synthesizer's memory. These correspond to a MIDI instrument program number also referred to as a "patch".

At step 340, a determination is made as to which MIDI files will be used in playing the wavetable instrument. This choice may be made automatically or by a user. These files are parsed to determine which notes will be triggered on which program numbers. If it is determined that the instruments that will potentially be loaded into any of the instrument slots(s) chosen at step 330 will not be triggered by the MIDI files, then this event may be reported to the calling application or user.

At step 350, using the information regarding the desired maximum size of each wavetable instrument, and the previously queried metadata, a determination is made as to how many samples each wavetable instrument will contain. This is performed by using the size of the largest sample in the instrument and calculating how many samples of that size can be included such that they are below the desired maximum size. The result is a good estimate, as in most cases all the samples within a source wavetable instrument will be approximately the same size. If there are significant differences in the sizes of samples contained in the source wavetable instrument, performing the estimate as if every sample is as large as the largest sample ensures that no underestimate of the combined size of the samples that will be chosen in the selection process of step 360. Underestimating could result in downloading a filtered wavetable instrument that is larger than the desired maximum.

At step 360, using the number of desired samples for each wavetable instrument, and the set of MIDI notes that will be used to play the instrument (see step 330 above), a determination is made as to which samples are to be filtered out. The filtering algorithm is described in more detail below.

At step 370, information regarding which instruments the returned wavetable data file is to contain and which samples these instruments are to include is sent to the proxy server 100 as a request to filter the wavetable data file message 303.

At step 380, operations 300 end with the return of filtered wavetable data 304 from the proxy server 100.

With respect to the proxy server software modules, at step 410, the operations 400 start. A request 301 is received from the wireless device for metadata.

At step 420, metadata is downloaded to the proxy server 100 from the content server 250. If there is no metadata to download, then the wavetable data file is downloaded to the proxy server 100 from the content server 250 and the metadata is extracted from it.

At step 430, the metadata 302 is sent to the client 210.

At step 440, a request 303 to filter a wavetable data file is received by the proxy server 100 from the client wireless device 210.

At step 450, the wavetable data file obtained is filtered, if necessary, and the resulting filtered file 304 is sent to the client 210. As will be described below, how this is accomplished depends on the wavetable data file format that is to be filtered.

Two of the components of the Musical Instrument Digital Interface ("MIDI") are the communications protocol (language) and a distribution format called Standard MIDI Files. The MIDI protocol is an entire music description language in binary form. Each word describing an action of musical performance is assigned a specific binary code. To sound a note in the MIDI protocol a "Note On" message is sent followed by an assigned "Velocity" which determines how loud the note will play. Other MIDI messages include selecting which instrument to play, mixing and panning sounds, and controlling various aspects of electronic musical instruments.

When MIDI messages are stored on disk, they are commonly saved in the Standard MIDI file format, which is slightly different from the native MIDI protocol, because the events are also time-stamped for playback in the proper sequence. Music delivered by MIDI files is the most common use of MIDI today. MIDI is the primary source of music in many popular PC games and CD-ROM entertainment titles, and thousands of MIDI files are available on the Internet for recreational use. Just about every personal computer is now equipped to play Standard MIDI files.

One reason for the popularity of MIDI files is that, unlike digital audio files (e.g., .wav, .aiff, etc.) or even CDs or cassettes, a MIDI file does not need to capture and store actual sounds. Instead, the MIDI file can be just a list of events which describe the specific steps that a soundcard or other playback device must take to generate certain sounds. This way, MIDI files are very much smaller than digital audio files, and the events are also editable, allowing the music to be rearranged, edited, even composed interactively, if desired.

The Downloadable Sounds ("DLS") format allows MIDI files to be combined with standardized samples of musical instruments, sound effects, or even dialogue, to recreate a copy of the sound intended by the composer. MIDI files with DLS are one solution for composers who want the predictable playback of digital audio, but also need the compactness and/or interactivity of Standard MIDI files for delivering their music.

Originally targeted for CD-ROM and Internet entertainment applications, DLS provides a means for game developers and composers to add their own custom sounds to the General MIDI ("GM") sound set (e.g., a list of sound names or "patches") stored in a sound card's ROM. DLS-compatible devices generally download these custom sounds from card, disk or CD-ROM into system RAM, allowing MIDI music to be freely augmented with new instrument sounds, dialog or special effects thus providing a universal interactive playback experience, along with an enhanced palette of sounds. At the same time, it enables wavetable synthesizers in computer sound cards to deliver improved audio at no additional cost. The combination of MIDI messages controlling small sound samples, as opposed to the use of streaming digitized audio, makes DLS especially appropriate for interactive multimedia applications, and for putting sound and music on web pages where fast downloading, seamless playback, and user interaction are critical.

The DLS file format generally follows the standard Microsoft® RIFF layout (with a form type of "DLS"), utilizing chunks and sub-chunks and incorporating standard WAVE files. The DLS file format is used to store both the digital sound data and articulation parameters needed to create one or more instruments. An instrument contains "regions" which point to WAVE files or samples also embedded in the DLS file. Each region specifies a MIDI note and velocity range which will trigger the corresponding sound and also contains articulation information such as envelopes and loop points. Articulation information can be specified for each individual region or for the entire instrument. The flexible file structure utilized by DLS means that a single sample may serve as different regions within different instruments. For example, a given sample can serve as region "1b" for instrument "1" while at the same time acting as region "2a" for instrument "2."

With respect to how the samples contained in a wavetable instrument affect the quality of audio playback, note that when creating wavetable instruments any transposing, or pitch shifting, used to reproduce tones for which there is no corresponding sample in the wavetable instrument's sample set will introduce some distortion of the timbres. Just how much distortion is determined by the number of samples included in the wavetable instrument, as well as the notes corresponding to those samples.

Multiple samples are included in a wavetable instrument so that the entire range of playable notes can be subdivided into subranges, known as "keysplits". Each keysplit region has an assigned sample which can be pitch shifted to reproduce all notes within the region. Having multiple keysplit regions and samples helps limit distortion as the pitch shifts required are not as large. That is, pitch shifting of a particular sample is limited to a specific range of notes. As an example of how the number of samples affects distortion, consider FIG. 4.

Figure 4:
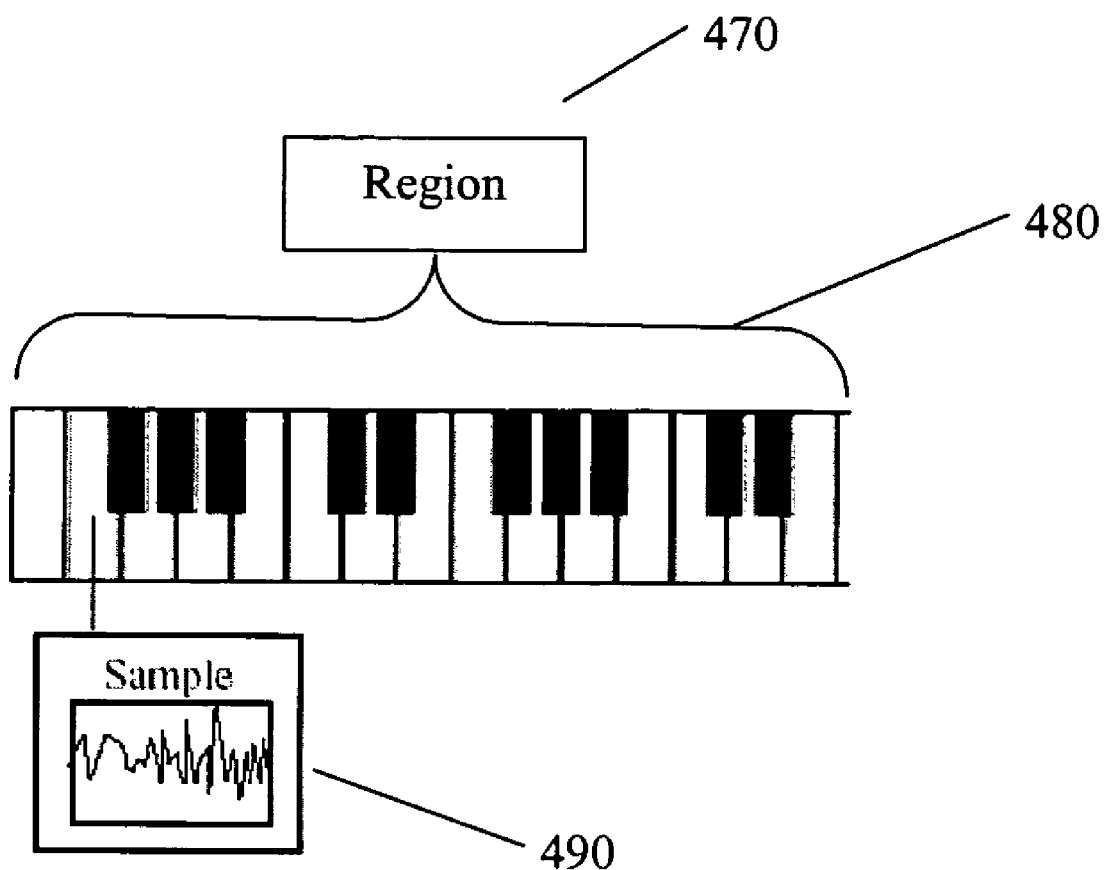
FIG. 4 is a block diagram illustrating a wavetable instrument (e.g., a piano) containing a single keysplit region over a two octave range in accordance with an embodiment of the invention.

FIG. 4 is a block diagram illustrating a wavetable instrument 460 (e.g., a piano) containing a single keysplit region 470 over a two octave range 480 in accordance with an embodiment of the invention. The sample 490 for the keysplit region 470 is of a sound that has the same pitch as the C note of the first octave. The further away a particular MIDI note X is from the C note of the sample 490, the more pitch shifting that will be required to play note X, and thus the more distorted it will be.

Figure 5:
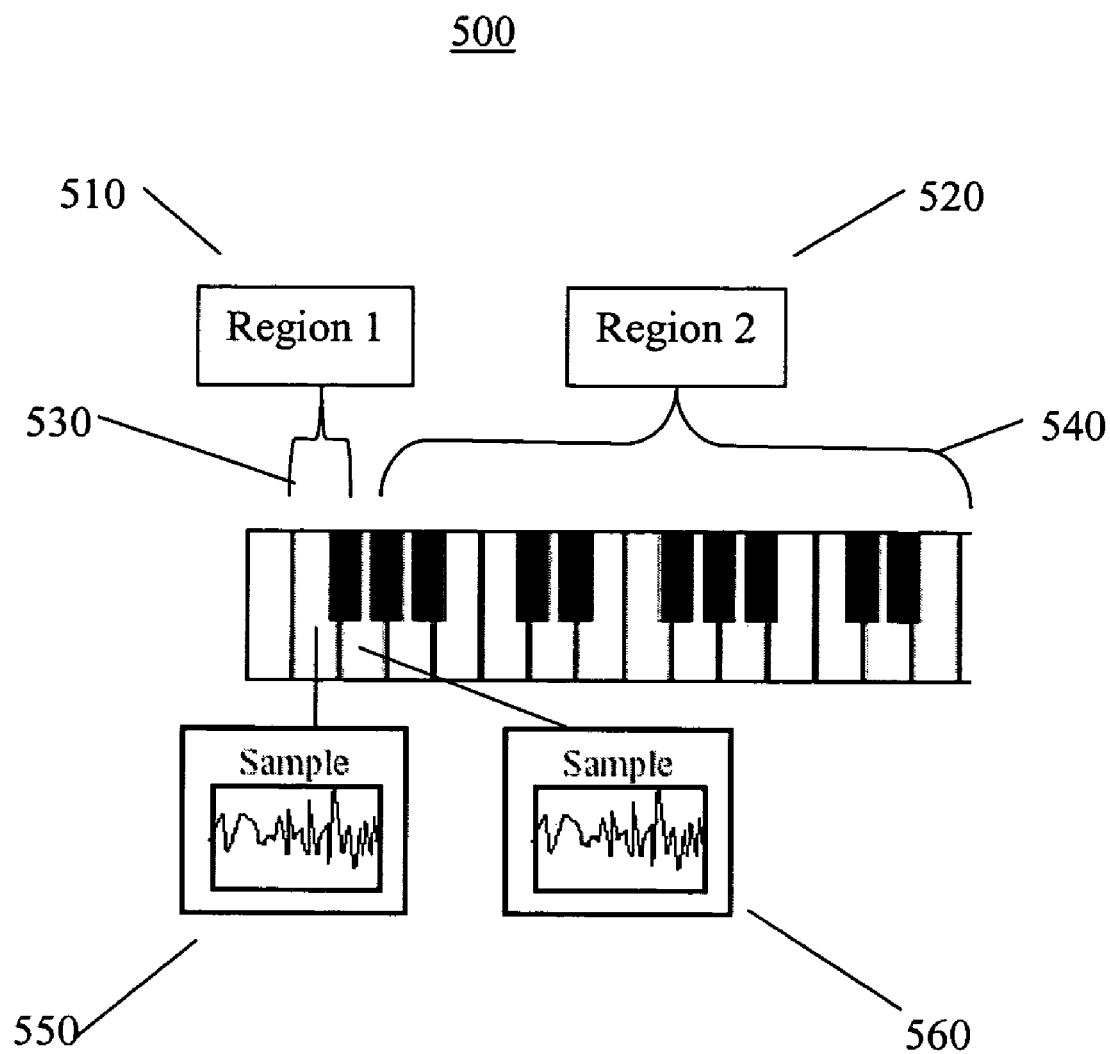
FIG. 5 is a block diagram illustrating a wavetable instrument containing two keysplit regions over a two octave range in accordance with an embodiment of the invention.

FIG. 5 is a block diagram illustrating a wavetable instrument 500 containing two keysplit regions 510, 520 over a two octave range 530, 540 in accordance with an embodiment of the invention. The sample 550 for region 1 510 is of a sound that has the same pitch as the C note of the first octave, and the sample 560 for region 2 520 is of a sound that has the same pitch as the D note of the first octave. Since there is more than one sample that can be shifted, the sample whose note is closest to the MIDI note X that is to be played can be pitch shifted, thus reducing the distortion when playing certain notes. That is, the notes starting from D in the first octave and above will all be less distorted when played on the wavetable instrument 500 of FIG. 5 than when played on the wavetable instrument 460 of FIG. 4.

Figure 6:
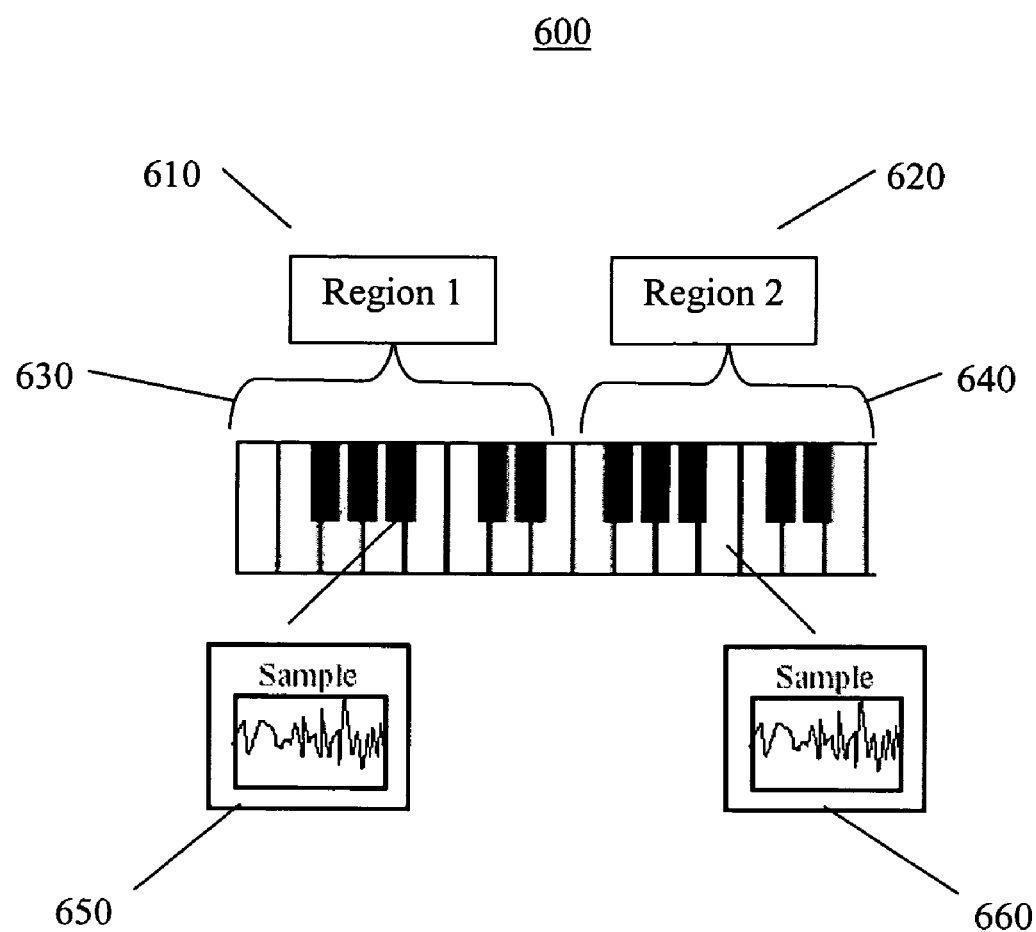
FIG. 6 is a block diagram illustrating a wavetable instrument containing two keysplit regions over a two octave range in accordance with an embodiment of the invention.

As an example of how the notes of the samples affect distortion, compare the wavetable instrument illustrated in FIG. 5 with the one illustrated in FIG. 6.

FIG. 6 is a block diagram illustrating a wavetable instrument 600 containing two keysplit regions 610, 620 over a two octave range 630, 640 in accordance with an embodiment of the invention. In FIG. 6, the keysplit regions 610, 620 and samples 650, 660 are distributed evenly over the range 630, 640. The wavetable instrument 600 of FIG. 6 is arranged so that the amount of pitch shifting required in playing the C note of the second octave is reduced. In fact, the largest pitch shift required to play any of the notes is 6 semitones compared to a largest pitch shift of 21 semitones for the wavetable instrument 500 of FIG. 5.

Thus, to build a wavetable instrument for playing any note, a good distribution of keysplit regions with samples includes an even distribution. However, if it is known that a wavetable instrument will be used to play a specific set of notes, it can be further optimized. In the following, a method for determining an optimized set of keysplits and samples for playback of a particular set of notes and a method of adapting this optimized set to fit the content contained in a pre-existing wavetable instrument will be described. These methods allow for the filtering out of the M samples that are least helpful with respect to playback quality.

In accordance with an embodiment of the invention, a method for determining which samples to discard in order to reduce the size of wavetable instruments will now be described. If a choice is made to reduce the size of the wavetable instrument by discarding some of the samples it contains, then playback quality may also be reduced because, as mentioned above, having more samples will result in less distorted playback. Since this reduces the effectiveness of one of the methods used to reduce distortion, close attention must be paid to the other method of reducing distortion as described above (i.e., the notes of the samples or the positioning of the samples throughout the note range) when choosing which samples to discard.

Having a wavetable instrument, a set of notes that will be played using the wavetable instrument, and knowing the number N of samples to be contained in the resulting wavetable instrument, creating an optimal balance of size and detail includes the following steps. First, a determination is made as to the preferred N keysplit regions and associated preferred samples that the resulting wavetable instrument should contain in order to have the highest quality playback of the set of notes that will be used to drive the wavetable instrument. By preferred samples it is meant the samples that would be desired if a sample of every note was available to choose from. Second, an adjustment is made to the preferred model to fit the samples contained in the wavetable instrument to be filtered. Typically, the available samples will not contain a sample for every corresponding MIDI note.

With respect to the first step of determining the preferred N keysplit regions and associated preferred samples the resulting wavetable instrument should contain, excluding the trivial cases where N=1 (i.e., the resulting wavetable instrument would contain one keysplit region that spans the lowest of the MIDI notes through the highest, with the preferred sample being at the midpoint note of the range) and where N>=# of MIDI notes that will be played using the wavetable instrument (i.e., the resulting wavetable instrument would have a keysplit region and corresponding preferred sample for every note), the method of determining the preferred splits and samples includes the following steps.

First, the largest gaps between consecutive MIDI notes is found. For example, if the list of notes contains MIDI note 60 (middle C) and MIDI note 63 (D#) without having notes 61 or 62 in the list, then the gap between them is of magnitude 2. By finding the largest gaps, it can be determined whether or not the set of MIDI notes should be subdivided into subsets, up to a maximum of N subsets, where each subset would be made its own keysplit region and would have its own sample, or whether evenly divided keysplits and evenly distributed samples should be created.

A gap is sufficiently large so that it should be subdivided when the magnitude of the gap is greater than half the distance spanned by the range of MIDI notes to the left of the gap, or greater than half the distance spanned by the range of MIDI notes to the right of the gap. This is so because in these cases, dividing and isolating into subsets and assigning samples to each subset would result in the MIDI notes being closer to a sample than they would be had a even distribution been chosen. For example, compare the wavetable instruments shown in FIGS. 7 and 8.

Figure 7:
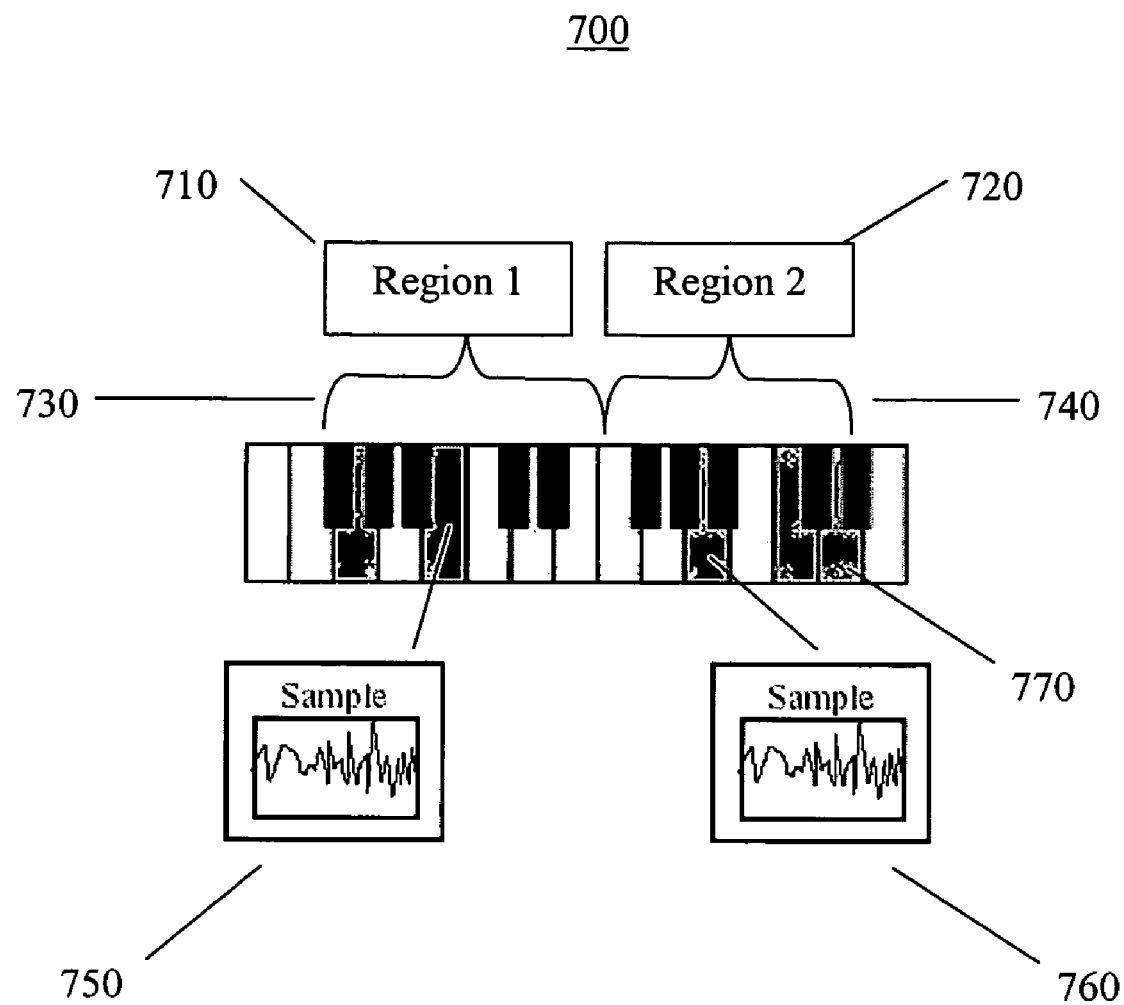
FIG. 7 is a block diagram illustrating a wavetable instrument containing two keysplit regions having ranges that span the notes starting at the D note of the first octave through the A note of the second octave in accordance with an embodiment of the invention.
Figure 8:
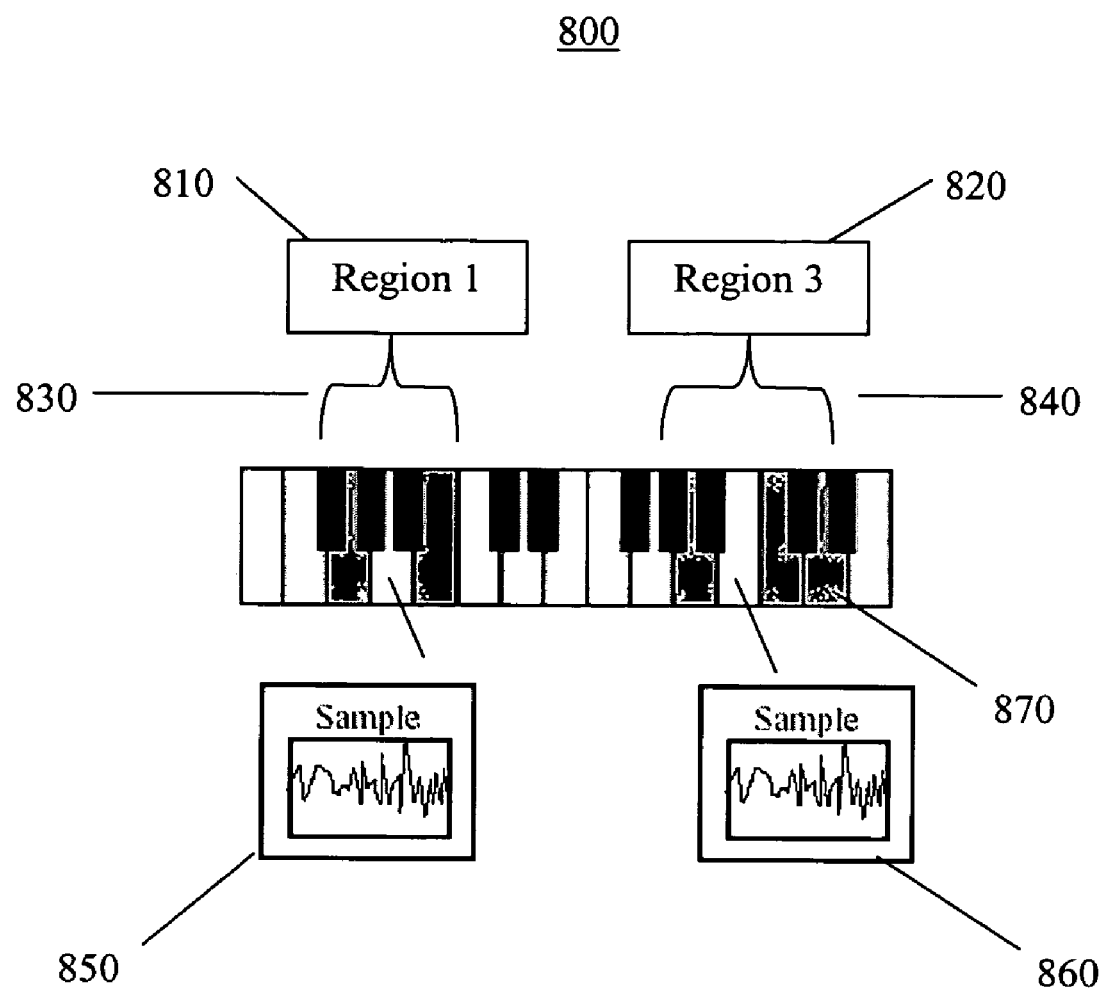
FIG. 8 is a block diagram illustrating a wavetable instrument containing two keyplit regions having ranges that span two disjoint subsets of notes starting at the D note of the first octave through the A note of the second octave in accordance with an embodiment of the invention.

FIG. 7 is a block diagram illustrating a wavetable instrument 700 containing two keysplit regions 710, 720 having ranges 730, 740 that span the notes starting at the D note of the first octave through the A note of the second octave in accordance with an embodiment of the invention. The keysplit regions 710, 720 and samples 750, 760 are distributed evenly over the ranges 730, 740. FIG. 8 is a block diagram illustrating a wavetable instrument 800 containing two keyplit regions 810, 820 having ranges 830, 840 that span two disjoint subsets of notes starting at the D note of the first octave through the A note of the second octave in accordance with an embodiment of the invention. The grey shaded keys 770, 870 represent notes that are contained in the desired list of MIDI notes.

The N largest gaps can be checked, and if each gap is large enough, the MIDI notes to the left of the gap can be isolated from those to the right of the gap. This will in essence provide a method to create keysplit regions. That is, those to the left of the gap will be contained in their own keysplit region, as will those to the right of the gap. If at each iteration it is determined that the largest gap is within a keysplit region created in one of the previous iterations, that keysplit region can also be subdivided into two new keysplit regions. At this point, specific samples for these keysplit regions are not being chosen. Rather, a sample is being granted to each region. This basically means that the value of a "pending sample count" variable for each region is being set to 1. This is done because, in the following step, any remaining samples will be granted to some of the regions, and how many samples a region has will affect which samples are chosen.

If N is greater than the number of keysplit regions created in the previous step, then it will be repeatedly determined which of the keysplit regions should be granted an additional sample (i.e., a "pending sample count" variable for that region will be incremented) until there are no more samples left to grant. At each iteration, a sample is granted to the region with the largest distance between an endpoint note and the nearest sample note if the region's "pending sample count" number of samples have already been distributed evenly.

Once the granting of all of the samples is completed, the regions with more than one sample granted to them will be subdivided evenly. Once the final set of keysplit regions is obtained, the preferred sample note for each region will be the region's midpoint note.

In addition, an initialization phase can be used to perform tasks such as arranging the input MIDI data and source wavetable data into data structures that can be used to access information quickly. For example, a data structure can be used to maintain information regarding the distance between consecutive MIDI notes (gaps).

Also, in the event of there being two or more gaps of the same magnitude, a tie breaker algorithm may be used to determine which of those gaps is the one to be processed next. An example may be to assign a greater priority to the gap that is contained in the region that has the most notes.

With respect to the second step of adjusting the preferred model to fit the samples contained in a wavetable instrument to be filtered, having knowledge of what samples are in the source wavetable instrument to be filtered, the preferred model calculated using the method described above can be adjusted to fit the samples available in the source wavetable instrument. This is performed by realigning the preferred keysplit regions and samples in order to derive a wavetable instrument that is the best quality given the source wavetable content that is available. Once the preferred model is adjusted, so that the finalized keysplit regions and samples are selected, the samples that are remaining are implicitly filtered out. The method of adjusting the preferred model involves the following steps.

First, the list of samples to be chosen from is narrowed. It can be known ahead of time whether some samples will never be chosen in the sample selection process. This is particularly true for samples whose note values are significantly less than the lowest note in the range of MIDI notes that will be used to play the wavetable instrument, and those whose note values are significantly higher. Choosing which samples should be included in the selection process can be performed as follows. If there are no samples within the MIDI note range, there are at most two samples that will be selected from, namely, the closest sample to the left of the range (if any) and the closest sample to the right (if any). If there are samples within the MIDI note range, it may still be desirable to include with them some samples from outside of the range in the selection process. To find out which of those outside the range should be included, the left most and right most samples within the range are found. The distance from the left end of the range to the leftmost sample within the range, minus one, is how far to the left of the note range that will be included in the search for samples. The same operation is performed with respect to the right side.

Second, new samples for each of the preferred keysplit regions are selected. This is performed as follows. Until all regions have been processed, find the region that will have to be skewed/adjusted the most. That is, the region that has the longest distance between the preferred sample and the closest of the two nearest samples to the right and the left of the preferred sample. Then, set the sample for this range to be the closer of the two samples on either side. If one end of the range is closer to the sample that was not chosen than to the sample that was chosen, mark the region as a potential "split-region". That is, add the region to a split-region list. After all of the regions have been adjusted, it will then be determined from the list of split-regions whether any of them should be split into their own region.

Third, if a split of some regions is to be performed, then an associated join will have to be performed as well. If two regions have already been adjusted and have chosen the same sample, then that can be considered as a join. If a join is already in hand, the worst of the split-regions can be split, the worst being the one that has an endnote that is furthest away from the note of the chosen sample.

If no joins are in hand, a different operation is required. The effect of the split has to be evaluated to determine whether it is wise to make the split. This is performed by determining how far away the end of the range which is closest to the sample "x" that was chosen previously is from the sample "y" of the next region beside it. That is, the region that will be potentially joined. If the distance is greater than or equal to the distance between the other end of the range and the sample "z" that is closest to that end, then the split is not required. If it is less than that distance, that endnote and its adjacent notes whose distance is also less can join the region for sample "y". The rest can join the region for sample "z".

Thus, in accordance with embodiments of the invention, before a wireless device client 210 downloads a wavetable instrument contained in a data file residing on a content server 250, a limit can be determined for how large the wavetable instrument is to be in order to fit the resources available. Or, a user can choose to set a predefined limit. After requesting metadata regarding the contents of the wavetable data file, using the limit, a determination can be made as to the maximum number of samples N contained in the wavetable instrument that can be downloaded to the wireless device while still having a combined size that is under the limit. Given this information, and having a set of MIDI files that will be used as instructions to play the wavetable instrument (i.e., the set of MIDI files can be specified by a user or application), it can be determined which N sampled notes contained in the wavetable instrument are the best ones to keep in the wavetable instrument when it is downloaded. By best, it is meant that they are the best N samples that, when used for playback of those particular MIDI instructions, will result in the highest quality or least distorted playback. The information regarding which samples are desired for the wavetable instrument are sent to a proxy server 100 as a request to filter out any extra samples from the wavetable instrument other than the desired samples. The proxy server 100 downloads the unmodified wavetable data file from the content server 250, filters it locally, and then returns the resulting file to the wireless device client 210.

Using the same algorithm to choose the best samples, it can also be determined which would be the M best samples to delete from an already downloaded wavetable instrument. This is advantageous when more flash is required in the wireless device 210 for incoming messages, calendar appointments, etc.

Figure 9:
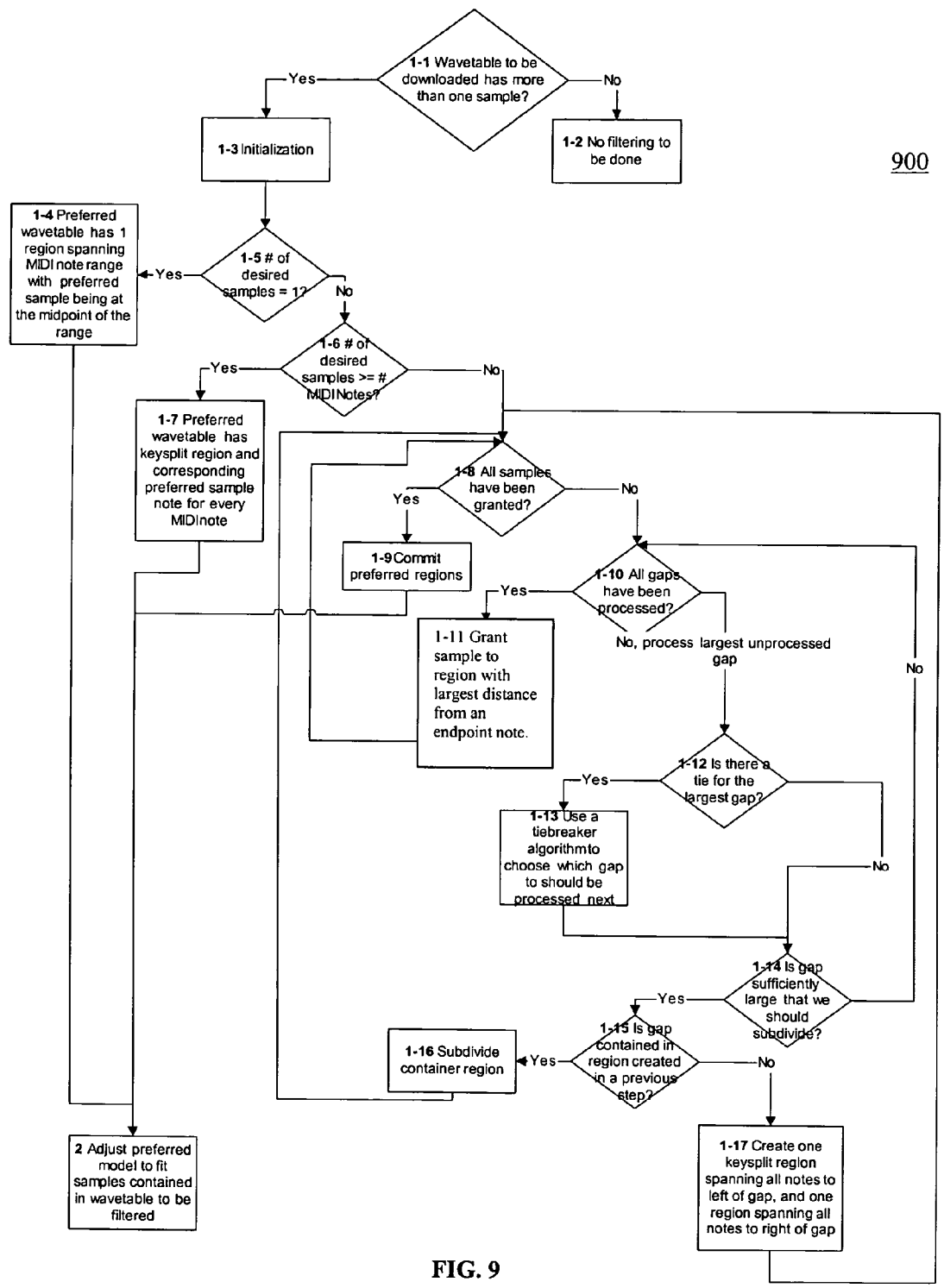
FIG. 9 is a flow chart illustrating operations of modules within the wireless communications system for determining keysplit regions and associated samples for a wavetable instrument in accordance with an embodiment of the invention.

The above described methods may be summarized with the aid of flowcharts. FIG. 9 is a flow chart illustrating operations 900 of modules within the wireless communications system for determining keysplit regions and associated samples for a wavetable instrument in accordance with an embodiment of the invention.

At step 1-1, the operations 900 start. A determination is made as to whether the wavetable to be downloaded has more than one sample.

At step 1-2, if the wavetable does not have more than one sample then no filtering is required and the operations 900 end.

At step 1-3, if the wavetable does have more than one sample, then an initialization operation (see above) is performed.

At step 1-5, a determination is made as to whether the number of desired samples is equal to one.

At set 1-4, if the number of desired samples does equal one, then the preferred wavetable has one region spanning the MIDI note range with the preferred sample being at the midpoint of the range. Operations then proceed to step 2.

At step 1-6, if the number of desired samples is not equal to one, then a determination is made as to whether the number of desired samples is greater than or equal to the number of MIDI notes.

At step 1-7, if the number of desired samples is greater than or equal to the number of MIDI notes, then the preferred wavetable has a keysplit region and corresponding preferred sample note for every MIDI note. Operations then proceed to step 2.

At step 1-8, if the number of desired samples is less than the number of MIDI notes, then a determination is made as to whether all the samples have been granted.

At step 1-9, if all the samples have been granted, then the preferred regions are committed and operations proceed to step 2.

At step 1-10, if all the samples have not been granted, then a determination is made as to whether all the gaps have been processed. If all the gaps have not been processed, then the largest unprocessed gap is processed and operations proceed to step 1-12.

At step 1-11, if all the gaps have been processed then the sample is granted to the region with the largest distance between an endpoint note and the nearest sample note if the region's "pending sample count" number of samples were to have been distributed evenly.

At step 1-12, a determination is made as to whether there is a tie with respect to the largest gap. If there is no tie, operations proceed to step 1-14.

At step 1-13, if there is a tie with respect to the largest gap, a tiebreaker mechanism (see above) is used to choose which gap should be processed next.

At step 1-14, a determination is made as to whether the gap is large enough to be subdivided. If not, operations return to step 1-10.

At step 1-15, if the gap is large enough to be subdivided, then a determination is made as to whether the gap is contained in a region created in a previous step.

At step 1-16, if the gap is contained in a region created in a previous step, then the container region is subdivided and operations return to step 1-8.

At step 1-17, if the gap is not contained in a region created in a previous step, then one keysplit region is created spanning all notes to the left of the gap and one keysplit region is created spanning all notes to the right of the gap. Operations then return to step 1-8.

Figure 10:
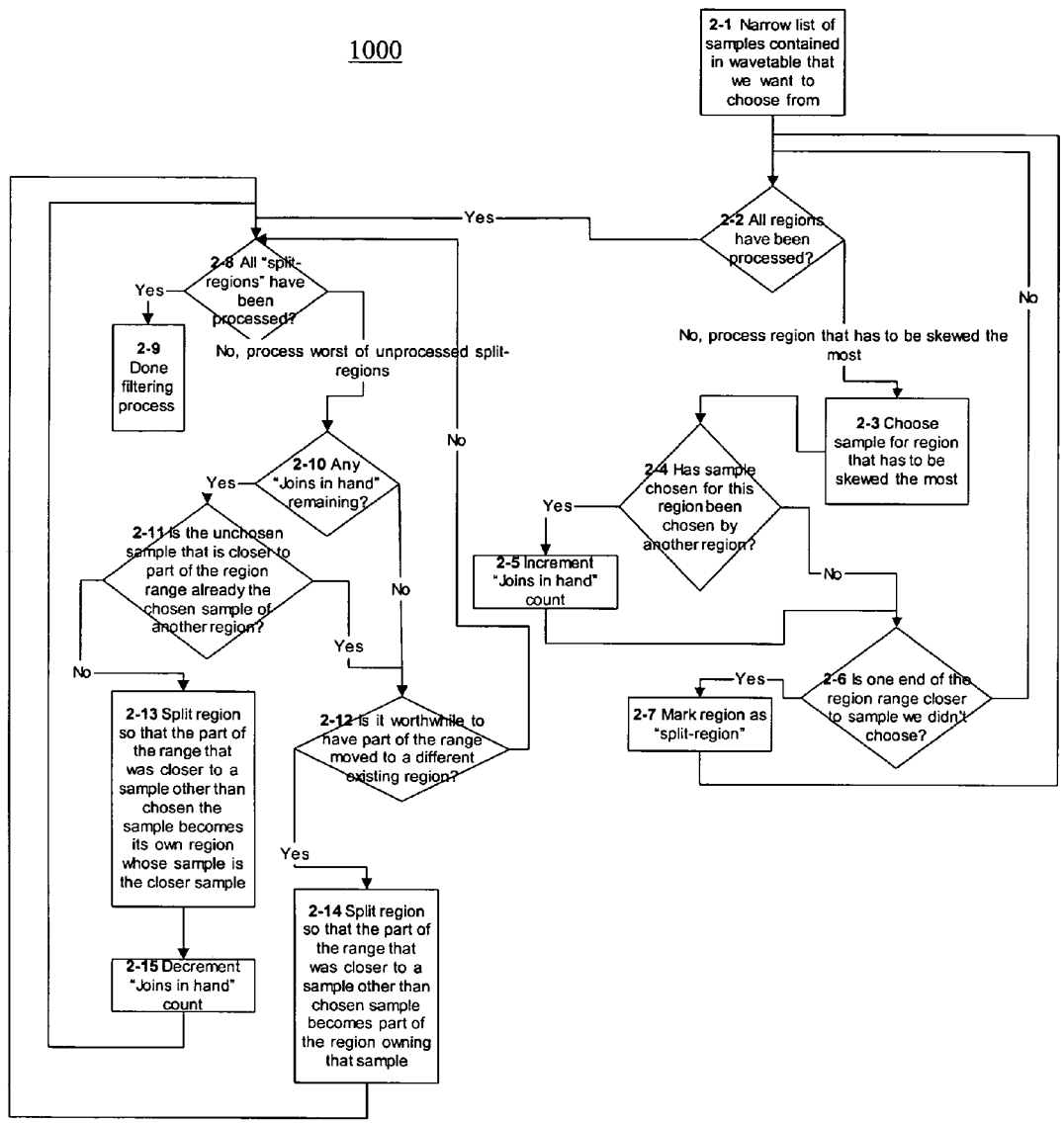
FIG. 10 is a flow chart illustrating operations of modules within the wireless communications system for adjusting the keysplit regions and associated samples in accordance with an embodiment of the invention.

At step 2, operations end when the preferred model is adjusted to fit samples contained in the wavetable to be filtered (see FIG. 10).

FIG. 10 is a flow chart illustrating operations 1000 of modules within the wireless communications system for adjusting the keysplit regions and associated samples in accordance with an embodiment of the invention.

At step 2-1, the operations 1000 start. The list of samples contained in the wavetable to be chosen from is narrowed.

At step 2-2, a determination is made as to whether all regions have been processed. If all regions have not been processed, the region that has to be skewed the most is processed and operations proceed to step 2-3. If all regions have been processed, then operations proceed to step 2-8 described below.

At step 2-3, a sample is chosen for the region that has to be skewed the most.

At step 2-4, a determination is made as to whether a sample chosen for the present region has been chosen for another region. If not, then operations proceed to step 2-6.

At step 2-5, if a sample chosen for the present region has been chosen for another region, then the "joins in-hand" count is incremented and operations proceed to step 2-6.

At step 2-6, a determination is made as to whether one end of the region range is closer to a sample that was not chosen. If not, then operations return to step 2-2.

At step 2-7, if one end of the region range is closer to a sample that was not chosen, then the region is marked as a "split-region" and operations return to step 2-2.

At step 2-8, a determination is made as to whether all "split-regions" have been processed. If not, the worst of the unprocessed split regions is processed and operations proceed to step 2-10.

At step 2-9, if all the "split-regions" have been processed then the filtering process is complete and the operations end.

At step 2-10, a determination is made as to whether there are any "joins in-hand" remaining. If so, then operations proceed to step 2-11. If not, then operations proceed to step 2-12.

At step 2-11, a determination is made as to whether the unchosen sample that is closest to part of the region range is already the chosen sample of another range. If not, then operations proceed to step 2-13. If so, then operations proceed to step 2-12.

At step 2-12, a determination is made as to whether it is worthwhile to have part of the range moved to a different existing region. If so, then operations proceed to step 2-14. If not, then operations return to step 2-8.

At step 2-13, proceeding from step 2-11, the region is split so that the part of the range that was closer to a sample other than the chosen sample becomes its own region whose sample is the closer sample. Operations then proceed to step 2-15.

At step 2-14, proceeding from step 2-12, the region is split so that the part of the range that was closer to a sample other than the chosen sample becomes part of the region owning that sample. Operations then return to step 2-8.

At step 2-15, proceeding from step 2-13, the "joins in-hand" count is decremented. Operations then proceed to step 2-8.

The above described methods for selecting samples for the wavetable instrument are generally performed by the wireless device 210. However, according to an alternate embodiment of the invention, one or more of these methods can be performed by the proxy server 100. In this embodiment, the wireless device 210 provides information pertaining to its available memory to the proxy server 100.

While this invention is primarily discussed as a method, a person of ordinary skill in the art will understand that the apparatus discussed above with reference to a communications system, a proxy server, a content server, and a wireless device, may be programmed to enable the practice of the method of the invention. Moreover, an article of manufacture for use with a communications system, such as a pre-recorded storage device or other similar computer readable medium including program instructions recorded thereon, may direct the communications system to facilitate the practice of the method of the invention. It is understood that such apparatus and articles of manufacture also come within the scope of the invention.

The embodiments of the invention described above are intended to be exemplary only. The scope of the invention is therefore intended to be limited solely by the scope of the appended claims.

I claim:

1. A method in a proxy server for providing wavetable information to a wireless device from a content server over a wireless network, the wavetable information including a plurality of samples corresponding to a plurality of notes, the method comprising:

receiving at the proxy server a request for metadata for the wavetable information from the wireless device, the request containing a selection of samples usable by a wavetable instrument on the wireless device, the metadata including sample sizes for the samples;

in response to the request from the wireless device, receiving at the proxy server the wavetable information from the content server;

filtering the wavetable information in accordance with the selection of samples contained in the request; and, transmitting the filtered wavetable information for the wavetable instrument to the wireless device;

wherein the wireless device is adapted for calculating a desired number of samples for the selection of samples from a maximum of the sample sizes and an amount of available memory in the wireless device; and wherein the wireless device is further adapted for determining the selection of samples by forming groups of notes based on spacings between the notes, allocating one of the desired number of samples to each group, and selecting a sample for the notes in each group that corresponds to a note at a midpoint of the group to reduce distortion.

2. The method of claim 1, further comprising, in response to the request for metadata, the proxy server transmitting the metadata to the wireless device.

3. The method of claim 2, further comprising the proxy server receiving the metadata from the content server.

4. The method of claim 2, further comprising the proxy server extracting the metadata from the wavetable information.

5. A system for filtering wavetable information from a content server for downloading to a wireless device over a wireless network, the wavetable information including a plurality of samples usable by a wavetable instrument on the wireless device corresponding to a plurality of notes, the system comprising:

a processor coupled to memory and to an interface to the wireless network and adapted for:

receiving a request for metadata for the wavetable information from the wireless device, the request containing a selection of samples for the wavetable instrument, the metadata including sample sizes for the samples;

in response to the request from the wireless device, receiving the wavetable information from the content server;

filtering the wavetable information for the wavetable instrument in accordance with the selection of samples contained in the request; and transmitting the filtered wavetable information to the wireless device;

wherein the wireless device is adapted for calculating a desired number of samples for the selection of samples from a maximum of the sample sizes and an amount of available memory in the wireless device; and wherein the wireless device is further adapted for determining the selection of samples by forming groups of notes based on spacings between the notes, allocating one of the desired number of samples to each group, and selecting a sample for the notes in each group that corresponds to a note at a midpoint of the group to reduce distortion.

6. The system of claim 5 wherein the processor is further adapted for, in response to the request for metadata, transmitting the metadata to the wireless device.

7. The system of claim 6 wherein the processor is further adapted for receiving the metadata from the content server.

8. The system of claim 6 wherein the processor is further adapted for extracting the metadata from the wavetable information.

9. A method for providing wavetable information to a wireless device from a content server over a wireless network, the wavetable information comprising a plurality of samples corresponding to a plurality of notes, the method comprising:

requesting metadata for the wavetable information, and receiving the metadata on the wireless device, the request comprising a selection of samples usable by a wavetable instrument on the wireless device;

requesting the wavetable information from the content server, the request comprising the selection of samples; and receiving filtered wavetable information for the wavetable instrument filtered in accordance with the selection of samples;

wherein the wireless device is adapted for calculating a desired number of samples for the selection of samples from a maximum of the sample sizes and an amount of available memory in the wireless device; and wherein the wireless device is further adapted for determining the selection of samples by forming groups of notes based on spacings between the notes, allocating one of the desired number of samples to each group, and selecting a sample for the notes in each group that corresponds to a note at a midpoint of the group to reduce distortion.

10. The method of claim 9, wherein the metadata comprises sample sizes for the samples in the wavetable information and a musical note associated with the respective samples in the wavetable information, each musical note providing an indication of a relative pitch of the respective sample.

11. The method of claim 9, wherein the step of selecting is based on the one or more of the capabilities and/or resources of the wireless device, the metadata for the wavetable information, and MIDI (Musical Instrument Digital Interface) data to be used by the wavetable instrument on the wireless device.

12. The method of claim 9, wherein a proxy server mediates communication between the wireless device and the content server.

13. The method of claim 12, wherein the metadata is received by the proxy server from the content server.

14. The method of claim 12, wherein the metadata is extracted by the proxy server from the wavetable information.

* * * * *